(12) United States Patent
Song

(10) Patent No.: US 8,126,053 B2
(45) Date of Patent: Feb. 28, 2012

(54) IMAGE ENCODING/DECODING METHOD AND APPARATUS

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1340 days.

(21) Appl. No.: 11/785,788

(22) Filed: Apr. 20, 2007

(65) Prior Publication Data

US 2008/0008239 A1    Jan. 10, 2008

(30) Foreign Application Priority Data

Jul. 4, 2006  (KR) ................ 10-2006-0062441

(51) Int. Cl.
*H04N 11/02* (2006.01)
(52) U.S. Cl. ............... 375/240.12; 382/166; 382/236
(58) Field of Classification Search ............ 375/240.11, 375/240.12, 240.13, 240.24, 240.25; 382/166, 382/236
See application file for complete search history.

(56) References Cited

U.S. PATENT DOCUMENTS

2005/0013363 A1*   1/2005   Cho et al. ............. 375/240.12

(Continued)

FOREIGN PATENT DOCUMENTS

EP       1538844 A2    6/2005

OTHER PUBLICATIONS

Ashok K Rao et al., "Multispectral Data Compression Using Bidirectional Interband Prediction", vol. 34, No. 2, Mar. 1, 1996, pp. 385-397, XP011020707.

Extended European Search Report issued Sep. 2, 2011 by the European Patent Office in counterpart European Patent Application No. 07807930.8.

(Continued)

*Primary Examiner* — Hadi Armouche
(74) *Attorney, Agent, or Firm* — Sughrue Mion, PLLC

(57) ABSTRACT

Image residue encoding and decoding methods and apparatuses are provided. In this method, a residue of a color component image is predicted from another color component image using a correlation between residues of the color component images, wherein the residues correspond to differences between input images and prediction images of the respective color component images constituting a single image, so that the encoding efficiency is improved.

26 Claims, 11 Drawing Sheets

U.S. PATENT DOCUMENTS

| | | |
|---|---|---|
| 2005/0141617 A1 | 6/2005 | Kim et al. |
| 2005/0281473 A1* | 12/2005 | Kim et al. .................. 382/236 |
| 2007/0053433 A1* | 3/2007 | Song ..................... 375/240.13 |
| 2007/0154087 A1* | 7/2007 | Cho et al. .................. 382/166 |
| 2007/0206872 A1* | 9/2007 | Song ........................... 382/236 |
| 2007/0223021 A1* | 9/2007 | Song .............................. 358/1.9 |
| 2008/0008238 A1* | 1/2008 | Song ..................... 375/240.11 |
| 2008/0019597 A1* | 1/2008 | Song ........................... 382/233 |
| 2008/0043840 A1* | 2/2008 | Song ..................... 375/240.11 |

OTHER PUBLICATIONS

S. Benierbah et al., "Compression of colour images by inter-band compensated prediction", vol. 153, No. 2, Apr. 6, 2006, pp. 237-243, XP006026172.

Xiaolin Wu et al., "Context-Based Lossless Interband Compression—Extending Calic", vol. 9, No. 6, Jun. 1, 2000, pp. 994-1001, XP011025613.

* cited by examiner

FIG. 6A

| $g_{-1,-1}$ | $g_{-1,0}$ | $g_{-1,1}$ | $g_{-1,2}$ | $g_{-1,3}$ | $g_{-1,4}$ | $g_{-1,5}$ | $g_{-1,6}$ | $g_{-1,7}$ | $g_{-1,8}$ | $g_{-1,9}$ | $g_{-1,10}$ | $g_{-1,11}$ | $g_{-1,12}$ | $g_{-1,13}$ | $g_{-1,14}$ | $g_{-1,15}$ |
|---|---|---|---|---|---|---|---|---|---|---|---|---|---|---|---|---|
| $g_{0,-1}$ | $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
| $g_{1,-1}$ | $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,-1}$ | $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,-1}$ | $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,-1}$ | $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,-1}$ | $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,-1}$ | $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,-1}$ | $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,-1}$ | $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,-1}$ | $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,-1}$ | $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,-1}$ | $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,-1}$ | $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,-1}$ | $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,-1}$ | $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,-1}$ | $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

| | $r_{-1,0}$ | $r_{-1,1}$ | $r_{-1,2}$ | $r_{-1,3}$ | $r_{-1,4}$ | $r_{-1,5}$ | $r_{-1,6}$ | $r_{-1,7}$ | $r_{-1,8}$ | $r_{-1,9}$ | $r_{-1,10}$ | $r_{-1,11}$ | $r_{-1,12}$ | $r_{-1,13}$ | $r_{-1,14}$ | $r_{-1,15}$ |
|---|---|---|---|---|---|---|---|---|---|---|---|---|---|---|---|---|
| $r_{0,-1}$ | $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
| $r_{1,-1}$ | $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,-1}$ | $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,-1}$ | $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,-1}$ | $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,-1}$ | $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,-1}$ | $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,-1}$ | $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,-1}$ | $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,-1}$ | $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,-1}$ | $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,-1}$ | $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,-1}$ | $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,-1}$ | $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,-1}$ | $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,-1}$ | $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

IMAGE ENCODING/DECODING METHOD AND APPARATUS

CROSS-REFERENCE TO RELATED APPLICATIONS

This application claims priority from Korean Patent Application No. 10-2006-0062441, filed on Jul. 4, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to image encoding and decoding, and more particularly, to an image encoding/decoding method and apparatus, in which using correlation between residues of a plurality of color component images, a residue of one of the color component images is predicted from a residue of another color component image, thereby improving encoding efficiency.

2. Description of the Related Art

In general, when an image is captured, the captured original image is in a red, green, and blue (RGB) color format. To encode the RGB color format image, the RGB color format image is transformed into a YUV (or YCbCr) color format. Y is a black-white image and has a luminance component and U (or Cb) and V (or Cr) have color components. Information is uniformly distributed over R, G, and B components in an RGB image, but information is concentrated in a Y component and the amount of information in U (or Cb) and V (or Cr) components is small in a YUV (or YCbCr) image. Thus, the YUV (or YCbCr) image can be compressed with high compression efficiency. To further improve compression efficiency, a YUV (or YCbCr) 4:2:0 image obtained by sampling color components U (or Cb) and V (or Cr) of an YUV (or YCbCr) image at a ratio of 1:4 is generally used.

However, since 1/4 sampling of U (or Cb) and V (or Cr) components in a YUV (or YCbCr) 4:2:0 image causes color distortion, it is not suitable for providing high display quality. Thus, a method for effectively encoding a YUV (or YCbCr) 4:4:4 image without sampling U (or Cb) and V (or Cr) is required. Recently, residual color transform (RCT) which directly encodes an RGB 4:4:4 image to remove color distortion occurring in transformation of an RGB image to a YUV (or YCbCr) image, or inter-plane prediction (IPP) has been suggested.

When an image like a YUV (or YCbCr) 4:4:4 image and an RGB 4:4:4 image in which color components have the same resolution is directly encoded using a related art encoding method, encoding efficiency is degraded. Thus, a method for improving encoding efficiency while maintaining high display quality by prediction based on the statistical characteristics of an image is required for a case where a YUV (or YCbCr) 4:4:4 image is encoded or an RGB image is encoded in an RGB domain without being transformed to a YUV (or YCbCr) format.

SUMMARY OF THE INVENTION

The present invention provides an image encoding/decoding method and apparatus, in which a residue of one of a plurality of color component images constituting a color image is predicted from another color component image using a correlation between the residues of the color component images, without transforming an RGB color format to another color format, thereby improving encoding efficiency.

According to an aspect of the present invention, there is provided an image encoding method comprising: generating a first residue block of each of a plurality of color component images of an input image, the first residue block corresponding to a difference between an input pixel block and a prediction pixel block of the each of the color component images; encoding the first residue block of a first color component image among the color component images; reconstructing the encoded first residue block of the first color component image; generating a second residue block of each of at least one of remaining color component images which does not comprise the first color component image by predicting a residue of the each of the at least one of the remaining color component images using the reconstructed first residue block of the first color component image; and generating a third residue block of the each of the at least one of the remaining color component images by calculating a difference between the first and second residue blocks of the each of the at least one of the remaining color component images.

According to another aspect of the present invention, there is provided an image encoding apparatus comprising: a prediction pixel block generating unit which generates a prediction pixel block of an input pixel block of each of a plurality of color component images constituting an input image; a residue generating unit which generates a first residue block of each of the color component images that corresponds to a difference between the input pixel block and the prediction pixel block of the each of the color component images, a second residue block of each of at least one of remaining color component images which does not comprise a first color component image among the color component images by predicting a residue of the each of the at least one of the remaining color component images using a reconstructed first residue block of the first color component image, and a third residue block of the each of the at least one of the remaining color component images, that corresponds to a difference between the first and second residue blocks of the each of the at least one of the remaining color component images; and an encoding unit which encodes the generated residue blocks.

According to another aspect of the present invention, there is provided an image decoding method comprising: receiving a bitstream comprising a first residue block of each of a plurality of color component images of an input image, the first residue block corresponding to a difference between an input pixel block and a prediction pixel block of the each of the color component images, and a third residue block of each of at least one of remaining color component images which does not comprise a first color component image among the color component images, the third residue block corresponding to a difference between a second residue block of the each of the at least one of the remaining color component images predicted using the first residue block of the first color component image, and the first residue block of the each of the at least one of the remaining color component images; decoding the first residue block of the first color component image and the third residue block of the each of the at least one of the remaining color component images; generating the second residue block of the each of the at least one of the remaining color component images by predicting a residue of the each of the at least one of the remaining color component images using the decoded first residue block of the first color component image; reconstructing a first residue block of the each of the at least one of the remaining color component images by adding the generated second residue block and the decoded third residue block; and reconstructing pixel blocks of the color component images by adding the prediction pixel block and the first residue block of the each of the color component images.

According to another aspect of the present invention, there is provided an image decoding apparatus comprising: a decoding unit which receives a first residue block of each of a plurality of color component images of an input image, the first residue block corresponding to a difference between an input pixel block and a prediction pixel block of the each of the color component images; and a third residue block of each of at least one of remaining color component images which does not comprise a first color component image among the color component images, the third residue block corresponding to a difference between a second residue block of the each of the at least one of the remaining color component images predicted using the first residue block of the first color component image, and the first residue block of the each of the at least one of the remaining color component images, and decodes the first residue block of the first color component image and the third residue block of the each of the at least one of the remaining color component images; a residue generating unit which generates the second residue block of the each of the at least one of the remaining color component images by predicting a residue of the each of the at least one of the remaining color component images using the decoded first residue block of the first color component image, and reconstructs a first residue block of the each of the at least one of the remaining color component images by adding the generated second residue block and the decoded third residue block of the each of the at least one of the remaining color component images; and a reconstructing unit which reconstructs pixel blocks of the color component images by adding the prediction pixel block and the first residue block of the each of the color component images.

BRIEF DESCRIPTION OF THE DRAWINGS

The above and other aspects of the present invention will become more apparent by describing in detail exemplary embodiments thereof with reference to the attached drawings, in which:

FIG. 6A illustrates a 16×16 first residue block of a G color component image according to an exemplary embodiment of the present invention;

FIG. 6B illustrates a 16×16 first residue block of a B color component image according to an exemplary embodiment of the present invention;

FIG. 6C illustrates a 16×16 first residue block of an R color component image according to an exemplary embodiment of the present invention;

DETAILED DESCRIPTION OF EXEMPLARY EMBODIMENTS

Hereinafter, exemplary embodiments of the present invention will be described in detail with reference to the accompanying drawings.

Terms used to explain the exemplary embodiments of the present will be defined.

A residue is defined as a difference between an original input image and a predicted image. When a color image comprises an R color component image, a G color component image, and a B color component image, residues of the color component images, $\Delta R$, $\Delta G$, and $\Delta B$, are defined as follows;

$$\Delta R = R - R_p$$
$$\Delta G = G - G_p$$
$$\Delta B = B - B_p \qquad (1)$$

In equation (1), R, G and B represent original input images of the color components, and $R_p$, $G_p$ and $B_p$ represent predicted images of the color components.

A first residue block is defined as a block of which pixels are comprised of differences between the original input block and the predicted block. Actually, the first residue block is identical with the residue block in a related art.

A second residue block is defined as a block of which pixels are predicted from reconstructed first residue blocks of a first color component image according to an exemplary embodiment of the present invention.

A third residue block is defined as a block of which pixels are comprised of differences between the first residue block and the second residue block.

Figure 1A:
FIGS. 1A through 1C respectively illustrate a red (R) color component image, a green (G) color component image, and a blue (B) color component image of a single color image.
Figure 1B:
Figure 1C:
Figure 2A:
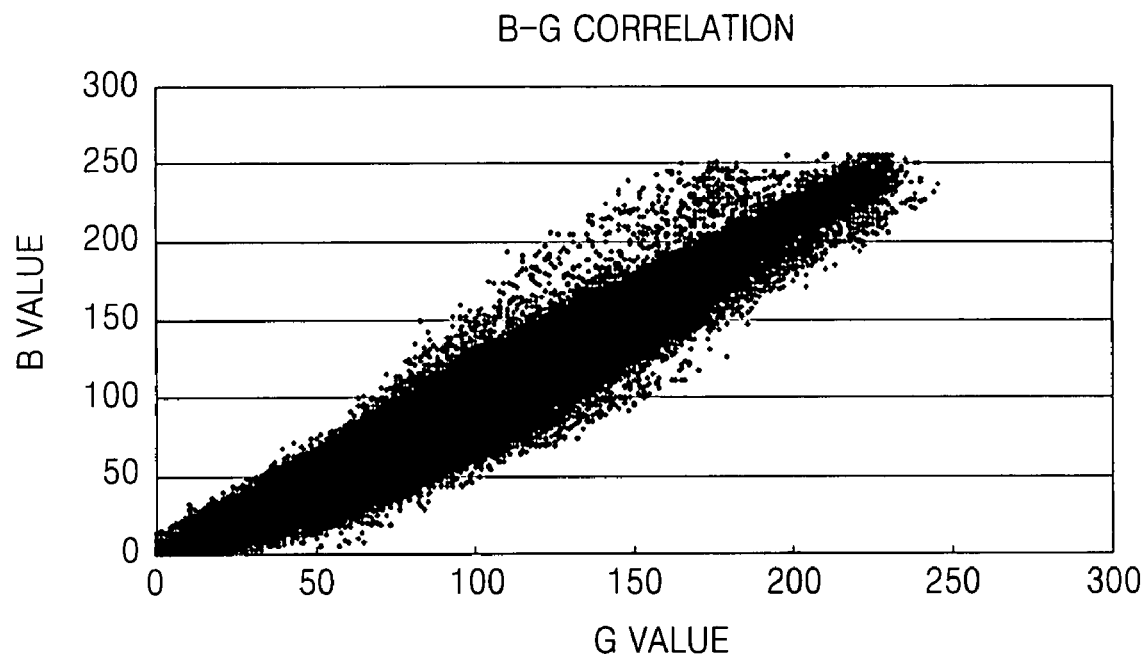
FIG. 2A is a graph showing correlation between the G color component image of FIG. 1B and the B color component image of FIG. 1C according to an exemplary embodiment of the present invention.
Figure 2B:
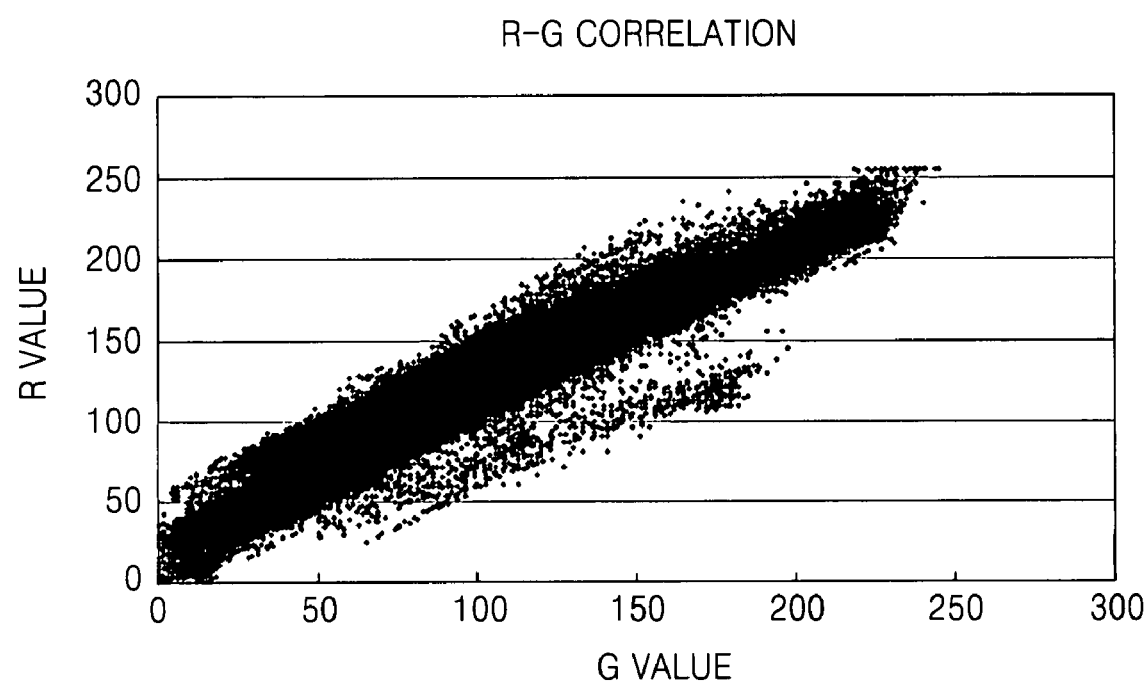
FIG. 2B is a graph showing correlation between the R color component image of FIG. 1A and the G color component image of FIG. 1B according to an exemplary embodiment of the present invention.

FIGS. 1A through 1C respectively illustrate an R color component image, a G color component image, and a B color component image of a single color image, FIG. 2A is a graph showing correlation between the G color component image of FIG. 1B and the B color component image of FIG. 1C, and FIG. 2B is a graph showing correlation between the R color component image of FIG. 1A and the G color component image of FIG. 1B.

In general, when a color image is encoded, predictive encoding is performed on each of color component images to remove redundant information in each of color components. Referring to FIGS. 1A through 1C, pixels of RGB color component images of a single color image at the same position have similar pixel values, which can also be seen from graphs illustrated in FIGS. 2A and 2B. In addition, when performing temporal or special prediction encoding on each of R, G, and B color components, the residues of the R, G, and B color components are highly correlated. Thus, redundancy information between the residues is eliminated using the correlation between the residues of the color component images, thereby markedly improving the compression efficiency.

Based on the above-described fact, the present invention provides an image encoding/decoding method and apparatus in which a residue of a first color component image among a plurality of color component images is used to predict a residue of a remaining color component image, and instead of encoding the residue of the remaining color component image as in a related art, only a difference between a predicted residue of the remaining color component image and an original residue of the remaining color component image is encoded.

Hereinafter, methods and apparatuses for encoding/decoding an image in an RGB 4:4:4 domain according to exemplary embodiments of the present invention will be described. The following description is focused on the encoding of a single macroblock in a current frame. For the convenience of description, it is assumed that encoding is performed in the order of a G color component image, a B color component image, and an R color component image, but not limited to this order.

Figure 3:
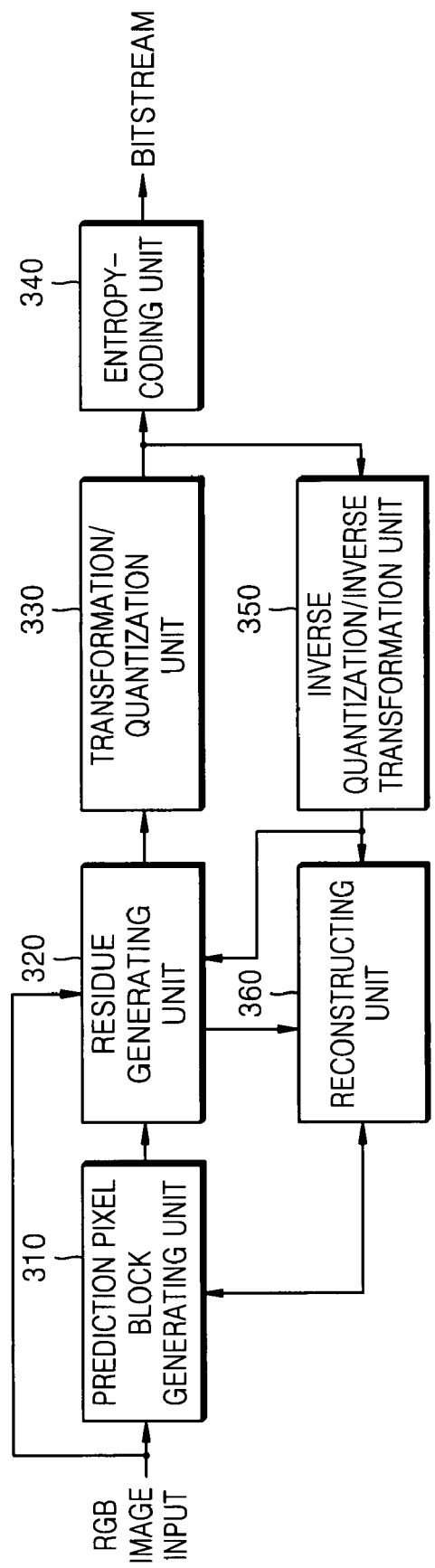
FIG. 3 is a block diagram of an image encoding apparatus according to an exemplary embodiment of the present invention.

FIG. 3 is a block diagram of an image encoding apparatus according to an exemplary embodiment of the present invention. Although the image encoding apparatus is assumed to comply with the H.264 standard for the convenience of explanation, it may also be applied to other image encoding apparatuses for performing residue coding.

Referring to FIG. 3, an image encoding apparatus 300 according to an exemplary embodiment of the present invention includes a prediction pixel block generating unit 310, a residue generating unit 320, a transformation/quantization unit 330, an entropy-coding unit 340, an inverse quantization/inverse transformation unit 350, and a reconstructing unit 360.

The prediction pixel block generating unit 310 performs intra or inter prediction on each color component image of an input image in units of an input pixel block having a predetermined size. Here, prediction according to, for example, the H.264 standard, or other modified intra or inter prediction methods can be used for the intra or inter prediction.

The residue generating unit 320 generates first residue blocks of color component images by calculating a difference between an input pixel block and a prediction pixel block of each color component image generated in the prediction pixel block generating unit 310. The residue generating unit 320 also generates a second residue block by predicting a residue of a remaining color component image using a reconstructed first residue block of a first color component image. In addition, the residue generating unit 320 generates a third residue block that is a difference between the first and second residue blocks of the remaining color component block.

Figure 4:
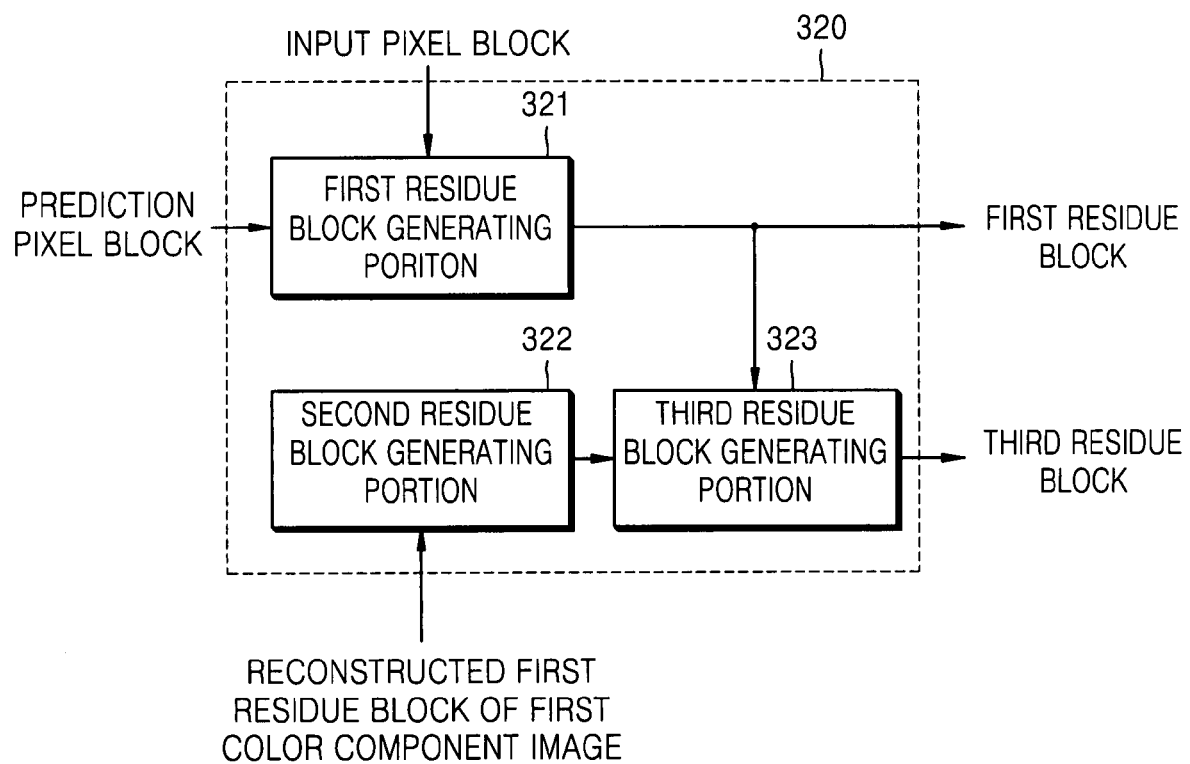
FIG. 4 is a block diagram of a residue generating unit 320 in FIG. 3 according to an exemplary embodiment of the present invention.

FIG. 4 is a detailed block diagram of the residue generating unit 320 in FIG. 3.

Referring to FIG. 4, the residue generating unit 320 comprises a first residue block generating portion 321, a second residue block generating portion 322, and a third residue block generating portion 323.

The first residue block generating portion 321 generates first residue blocks of the color component images by calculating a difference between an input pixel block and a prediction pixel block of each color component image generated in the prediction pixel block generating unit 310. For example, the first residue generating unit 320 generates a first residue block of a G color component image, a first residue block of a B color component image, and a first residue block of an R color component image by calculating a difference between an input pixel block and a prediction pixel block of each of the R, G, and B color component images.

The second residue block generating portion 322 generates a second residue block of a remaining color component image using a reconstructed first residue block of a first color component image.

As described above, the residues of the color component images constituting a single color image are correlated and can be modeled using a first-order function. The second residue block generating portion 322 generates a second residue block of the remaining color component image by predicting a residue of the remaining color component image using a residue value, which is used as a parameter, of the reconstructed first residue block of the first color component image and a predictor generated by a linear modeling process. For example, assuming that the first color component image is a G color component image, the second residue block generating portion 322 generates a second residue block of each of the B and R color component images by predicting residue blocks of the B and R color component images using a reconstructed first residue block of the G color component image that has been transformed and quantized by the transformation/quantization unit 330, and inversely quantized and inversely transformed by the inverse quantization/inverse transformation unit 350. The linear modeling process for predicting residue blocks of the remaining color components image using the first residue block of the first color component image will be described later.

The third residue block generating portion 323 generates a third residue block by calculating a difference between the first and second residue blocks of the remaining color component image.

As described above, the first residue block of the first color component image among the residue blocks of the color component images is transformed, quantized, and entropy-coded. However, for the remaining color component image excluding the first color component image, the third residue block that is a difference between the first and second residue blocks of the remaining color component image, not the first residue block, are encoded. The third residue block of the remaining color component image is smaller than the first residue block, which corresponds to the original residue block, so that a smaller amount of bits can be allocated to the residue block of the remaining color component image, thereby improving the encoding efficiency.

The transformation/quantization unit 330 transforms and quantizes the first residue block of the first color component image and the third residue block of the remaining color component image, which is generated in the residue generating unit 320. The entropy-coding unit 340 entropy-codes the transformed and quantized residue blocks and outputs a bitstream. Orthogonal transform coding can be used for the transformation. Commonly used orthogonal transform coding methods include fast Fourier transform (FFT), discrete cosine transform (DCT), Karhunen-Loeve Transform (KLT), Hadamard transform, slant transform, etc.

The inverse quantization/inverse transformation unit 350 inversely quantizes and inversely transforms the first residue block of the first color component image, which has been transformed and quantized by the transformation/quantization unit 330, and outputs the inverse-quantized and inverse-transformed first residue block to the residue generating unit 320 to allow generation of the second residue block, which is a prediction residue block of the remaining color component image.

The reconstructing unit 360 reconstructs a pixel block of each of the color component images by adding the prediction pixel block of each of the color component images, which are generated by the prediction pixel block generating unit 310, and the first residue block of each of the color component images. Here, the first residue block of the remaining color component image can be the first residue block of the remaining color component image generated in the residue generating unit 320, or the result of adding the second residue block of the remaining color component image generated in the residue generating unit 320 and the third residue block of the remaining color component image reconstructed in the inverse quantization/inverse transformation unit 350. The pixel block of each of the color component images reconstructed in the reconstructing unit 360 is input to the prediction pixel block generating unit 310 for prediction coding of another pixel block.

Figure 5:
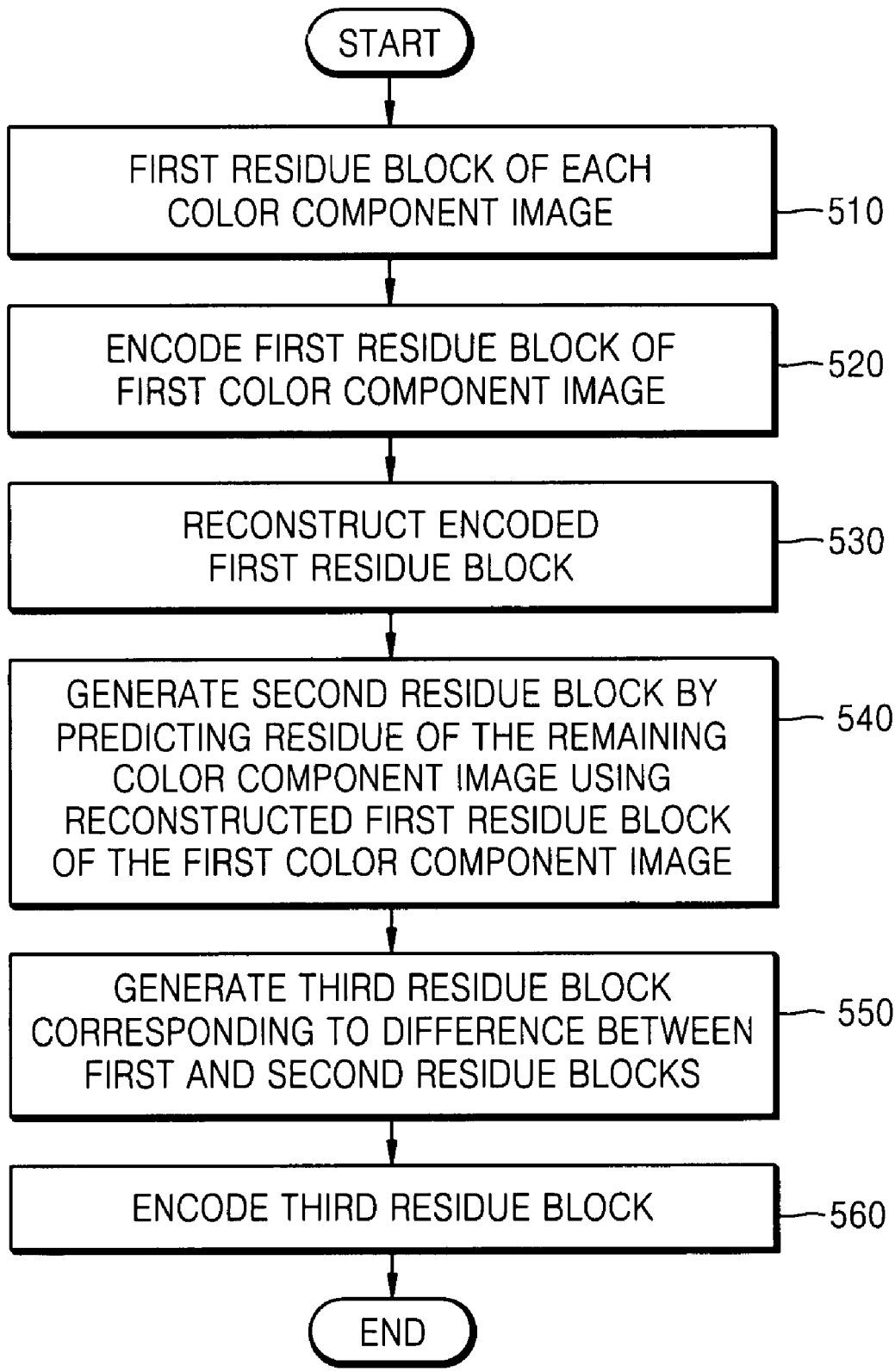
FIG. 5 is a flowchart illustrating an image encoding method according to an exemplary embodiment of the present invention.

FIG. 5 is a flowchart of an image encoding method according to an exemplary embodiment of the present invention. Hereinafter, the operation of the image encoding apparatus and the image encoding method according to exemplary embodiments of the present invention will be described with reference to FIGS. 3 through 5.

In operation 510, the first residue block generating portion 321 generates a first residue block of each color component image by calculating a difference between an input pixel block having a predetermined size of each color component image forming an input color image, and a prediction pixel block of each color component image generated in the prediction pixel block generating unit 310.

In operation 520, a first residue block of a first color component image, among the first residue blocks of the color component images, is encoded by transformation, quantization, and then entropy-coding.

In operation 530, the transformed and quantized first residue block of the first color component image is reconstructed by inverse quantization and inverse transformation.

In operation 540, the second residue block generating portion 322 generates a second residue block of the remaining color component image using the reconstructed first residue block of the first color component image. Hereinafter, with the assumption that an input image includes R, G, and B color component images, and the G, B, and R color component images are sequentially coded, a process of predicting second residue blocks of the B and R color component images using the reconstructed first residue block of the G color component image will be described in detail.

Figure 6B:
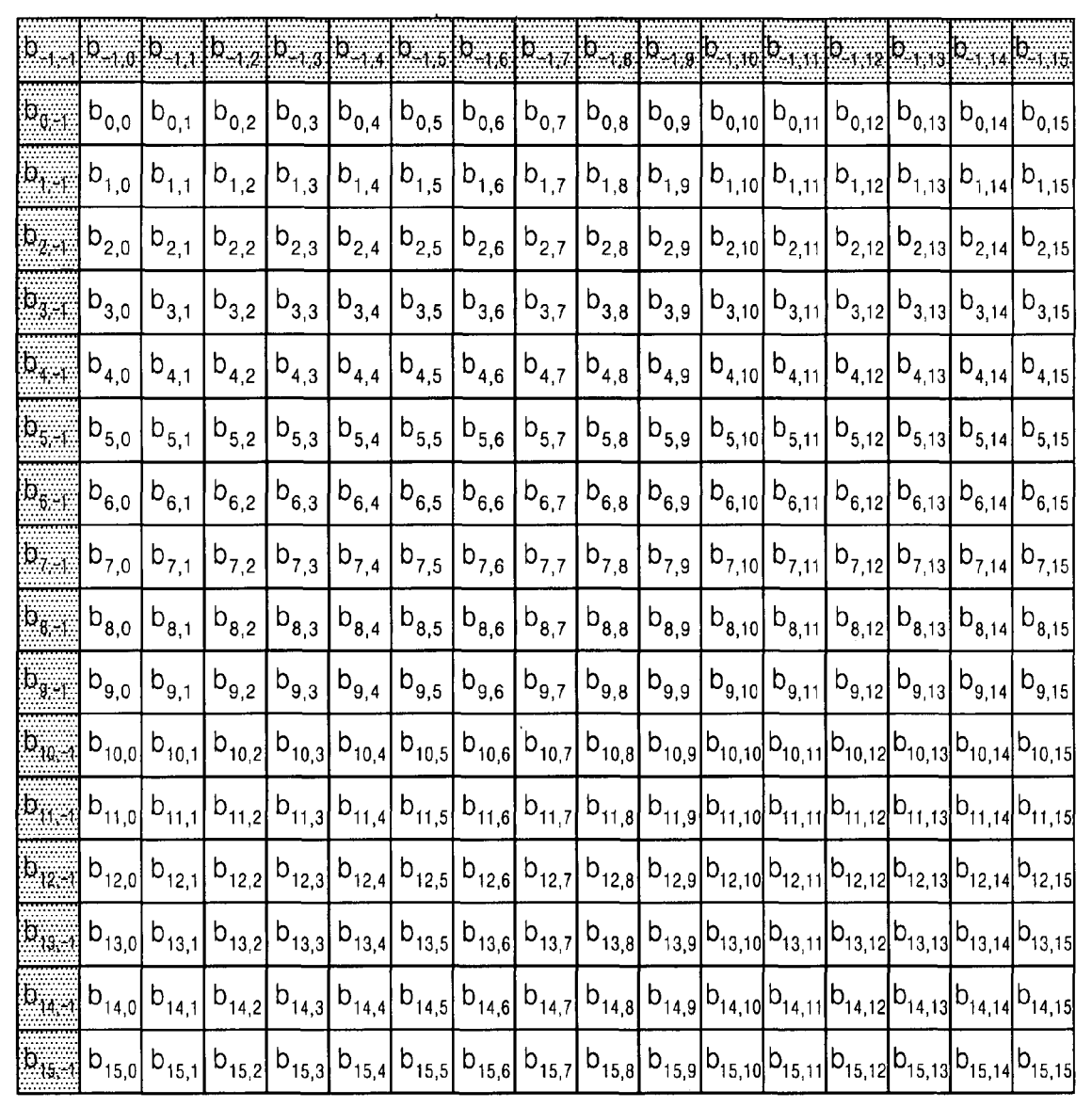

FIG. 6A illustrates a 16×16 first residue block of a G color component image, FIG. 6B illustrates a 16×16 first residue block of a B color component image, and FIG. 6C illustrates a 16×16 first residue block of an R color component image. Here, $g_{ij}$, $b_{ij}$, and $r_{ij}$ indicate first residue values in an $i^{th}$ row and a $j^{th}$ column of a 16×16 pixel block of the respective G, B, and R color component images. In FIGS. 6A through 6C, hatched residues indicate reconstructed residues of a neighbor residue block processed prior to the current residue block.

It is assumed that $g'_{ij}$ denotes a residue value in an $i^{th}$ row and a $j^{th}$ column of the reconstructed first residue block of the G color component image, $\overline{b_{ij}}$ denotes a prediction residue value, which corresponds to $g'_{ij}$, in an $i^{th}$ row and a $j^{th}$ column of a first residue block pixel block of the B color component image, a denotes a predetermined weight, and b denotes a predetermined offset value. The second residue block generating portion 322 models correlation between the reconstructed first residue block of the G color component image and the first residue block of the B color component image as a first-order function expressed by Equation 2 below. The second residue block generating portion 322 generates prediction residue values $\overline{b_{ij}}$ of residues in the first residue blocks of the B color component image using the residue values $g'_{ij}$ in the reconstructed first residue block of the G color component image as a parameter.

$$\overline{b}_{ij}=a \times g'_{ij}+b \qquad (2)$$

As described above, a residue block of the B color component image having the prediction residue values obtained using Equation (2) is defined as the second residue block of the. B color component image. The prediction residue values of the B color component image obtained using Equation (2), i.e., the residue values of the second residue block, are clipped to integers between −255 and 255. a and b in Equation (2) may change according to the position (i, j) of a pixel, and are assumed to be constant within a predetermined block in an exemplary embodiment of the present invention.

a and b in Equation (2) may be determined as functions of the residue values of a reconstructed neighbor residue block of the G color component image and the residue values of a reconstructed neighbor residue block of the B color component image, as in Equations (3) and (4).

$$a=m(g'_{-1,0}, \ldots, g'_{-1,15}, g'_{0,-1}, \ldots, g'_{15,-1}, \\ b'_{-1,0}, \ldots, b'_{-1,15}, b'_{0,-1}, \ldots, b'_{15,-1}) \qquad (3)$$

$$b=h(g'_{-1,0}, \ldots, g'_{-1,15}, g'_{0,-1}, \ldots, g'_{15,-1}, b'_{-1,0}, \ldots, \\ b'_{-1,15}, b'_{0,-1}, \ldots, b'_{15,-1}) \qquad (4)$$

a and b in Equation (2) can be defined in various manners. For example, a and b satisfying Equation (2) may be determined by applying a linear regression model, which is widely used in the field of statistics, to pairs of residues of a reconstructed neighbor residue block of the G color component image and a corresponding reconstructed neighbor residue block of the B color component image.

As another example, a and b satisfying Equation (2) may be determined to be values that minimize differences between prediction residue values of a neighbor pixel block of the B color component image, which is obtained by substituting the residue values of the reconstructed neighbor residue block of the G color component image into Equation (2), and residue values of a reconstructed neighbor residue block of the B color component image. As another example, a may be determined as 1, and b may be determined as the average of differences between residue values of a reconstructed neighbor pixel block of the B color component image and residue values of a reconstructed neighbor pixel block of the G color component image using Equation (5) below:

$$b = \frac{\sum_{i=0}^{15}(b'_{-1,i}-g'_{-1,i})+\sum_{j=0}^{15}(b'_{j,-1}-g'_{j,-1})}{32} \qquad (5)$$

In the above-described examples, residue values of a reconstructed neighbor residue block adjacent to the current residue block are used to determine a and b satisfying Equation (2). The residue values of a neighbor residue block used to determine a and b satisfying Equation (2) may include residue values of at least one neighbor residue block including a residue block adjacent to an upper or left side of the current residue block.

Figure 7A:
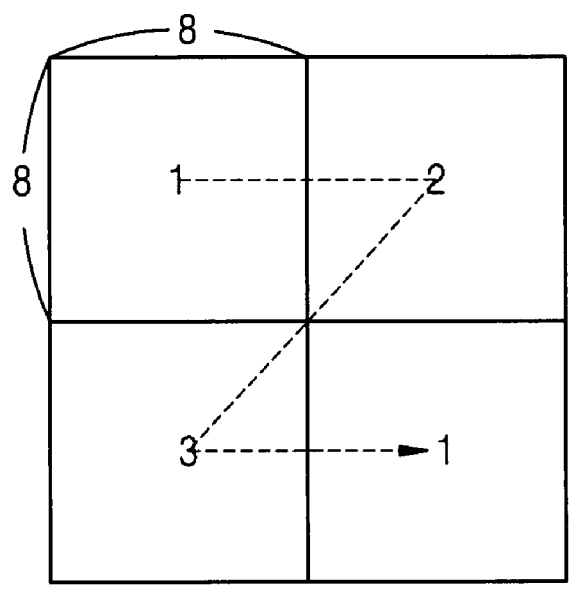
FIG. 7A illustrates the processing order of 8×8 residue blocks in an image encoding method and method according to an exemplary embodiment of the present invention.
Figure 7B:
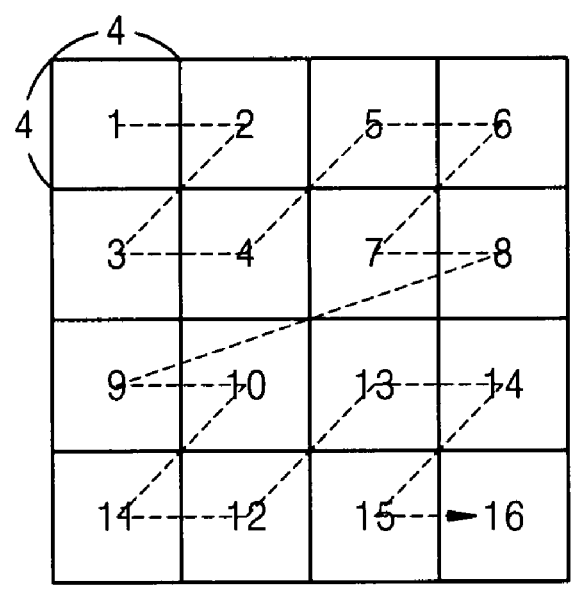
FIG. 7B illustrates the processing order of 4×4 residue blocks in an image encoding method and apparatus according an exemplary embodiment of to the present invention.

FIG. 7A illustrates the processing order of 8×8 pixel blocks in an image encoding method and apparatus according to an exemplary embodiment of the present invention, and FIG. 7B illustrates the processing order of 4×4 pixel blocks in an image encoding method and apparatus according to an exemplary embodiment of the present invention The second residue block generating portion 322 can generate second residue blocks of the remaining color component image by dividing a 16×16 residue block into 8×8 residue blocks or 4×4 residue blocks.

Referring to FIG. 7A, when a residue block of the B color component image is processed in units of 8×8 blocks, 8×8 residue blocks of the B color component image are sequentially predicted left-to-right and top-to-bottom. Although the block size has been changed, residue values of each 8×8 first residue block of the B color component image can be predicted using Equation 2 in a similar manner to the above-described process of predicting the residue value of the 16×16 first residue block of the B color component image. For example, a may be determined as 1, and b may be determined as the average of differences between residue values of a reconstructed neighbor residue block of the B color component image, and residue values of a reconstructed neighbor residue block of the G color component image as follows:

$$b = \frac{\sum_{i=0}^{7}(b'_{-1,i} - g'_{-1,i}) + \sum_{j=0}^{7}(b'_{j,-1} - g'_{j,-1})}{16} \quad (8)$$

Referring to FIG. 7B, when a residue block of the B color component image is processed in units of 4×4 blocks, sixteen 4×4 residue blocks of the B color component image are sequentially predicted left-to-right and top-to-bottom. Residue values of each 4×4 residue block of the B color component image can be predicted using Equation 2 in a similar manner to the above-described process of generating a second residue block by predicting a 16×16 first residue block or 8×8 first residue block of the B color component image. For example, a of Equation 2 may be determined as 1, and b of Equation 2 may be determined as the average of differences between residue values of a reconstructed neighbor residue block of the B color component image, and residue values of a reconstructed neighbor pixel block of the G color component image as in Equation (10) below:

$$b = \frac{\sum_{i=0}^{3}(b'_{-1,i} - g'_{-1,i}) + \sum_{j=0}^{3}(b'_{j,-1} - g'_{j,-1})}{8} \quad (10)$$

As described above, once a and b of Equation (2) are determined in various manners as described above, a second residue block of the B color component image can be generated by substituting the residue values of the reconstructed first residue block of the G color component image into Equation (2).

As described above, the second residue block of the B color component image may be generated in units of 16×16 blocks, 8×8 blocks, or 4×4 blocks. As an adaptive example, prediction for each macroblock may be performed in units of a block in one of the three block modes.

Next, residue values of the second residue block of the R color component image may be predicted using residue values of the first residue block of the G color component image in a similar manner to the above-described process of generating the second residue block of the B color component image.

Referring back to FIG. 5, once the second residue blocks of the remaining color component images, i.e., the B and R color component images, are generated in operation 540, the third residue block generating portion 323 generates a third residue block of each of the remaining color component images by calculating a difference between the first and second residue blocks of the corresponding color component image in operation 550. For example, the third residue block generating portion 323 generates a third residue block of the B color component image by subtracting the second residue block of the B color component image from the first residue block of the B color component image, and generates a third residue block of the R color component image by subtracting the second residue block of the R color component image from the first residue block of the R color component image.

In operation 560, the third residue block of each of the remaining color component images is transformed, quantized, and entropy-encoded and is output as a bitstream.

In addition, when generating the second residue block of the R color component image, the second residue block generating portion 322 may generate the second residue block of the R color component image using the reconstructed first residue block of the previously processed B color component image, instead of using the reconstructed first residue block of the G color component image. In other words, after reconstructing the first residue block of the B color component image by adding the reconstructed third residue block of the B color component image and the second residue block of the B color component image predicted from the reconstructed first residue block of the G color component image, the second residue block of the R color component image can be generated using the reconstructed first residue block of the B color component image in a similar manner to the above-described process of generating the second residue block of the B color component image.

In particular, assuming that $b'_{i,j}$ denotes a residue value of a pixel in an $i^{th}$ row and a $j^{th}$ column of a reconstructed pixel block of the B color component image, $\overline{r_{ij}}$ denotes a prediction value, which corresponds to $b'_{ij}$, of a pixel in an $i^{th}$ row and a $j^{th}$ column of a residue block of the R color component image, and c denotes a predetermined weight, and d denotes a predetermined offset value, the second residue block generating portion 322 predicts corresponding residue values of the R color component image by substituting the reconstructed residue values of the B color component image into Equation (11) below:

$$\overline{r_{i,j}} = c \times b'_{i,j} + d \quad (11)$$

c and d in Equation (11) may be determined in a similar manner as used to determine a and b. A residue block of the R color component image with the prediction residue values $\overline{r_{ij}}$ obtained using Equation (11) forms the second residue block of the R color component image. The third residue block generating portion 323 generates a third residue block by calculating a difference between the first and second residue blocks of the R color component image.

A bitstream of a color image encoded using the above-described image encoding method according to an exemplary embodiment of the present invention includes encoded first residue block information of a first color component image and third residue block information of the remaining color component image. In addition, the encoded bitstream may include predictor information, for example, a and b of Equation (2) or c and d of Equation (11), which are used to generate the second residue block. However, when a and b of Equation (2) or c and d of Equation (11) are generated using reconstructed neighbor pixel block information in a decoding unit in the same manner as used in an encoding unit, there is no need to insert a and b or c and d into the bitstream.

In the decoding unit, the pixel block of the first color component image can be reconstructed by decoding the first residue block of the first color component image, and adding the decoded first residue block and a prediction pixel block of the first color component image. When decoding the remaining color component image, after a first residue block of the remaining color component image is reconstructed by adding the second residue block of the remaining color component image, which has been predicted using the previously decoded first residue block of the first color component image, and the decoded third residue block, the decoded first residue blocks of the remaining color component image is added to a prediction pixel block of the remaining color component image, thereby reconstructing a pixel block of the remaining color component image.

Figure 8:
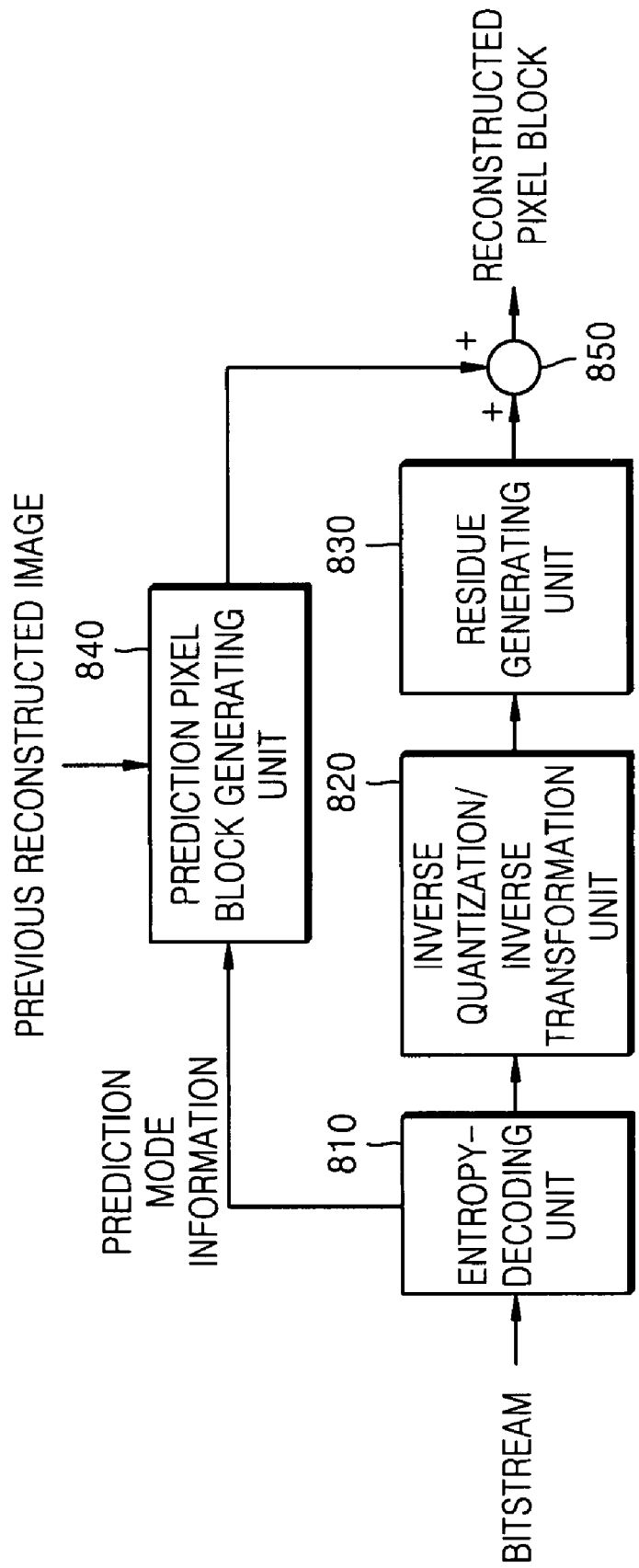
FIG. 8 is a block diagram of an image decoding apparatus according to another exemplary embodiment of the present invention.

FIG. 8 is a block diagram of an image decoding apparatus according to an exemplary embodiment of the present invention.

Referring to FIG. 8, an image decoding apparatus 800 according to an exemplary embodiment of the present invention includes an entropy-decoding unit 810, an inverse quantization/inverse transformation unit 820, a residue generating unit 830, a prediction pixel block generating unit 840, and a reconstructing unit 850.

The entropy-decoding unit 810 receives a bitstream and performs entropy-decoding on the bitstream. The inverse quantization/inverse transformation unit 820 performs inverse quantization and inverse transformation in order to extract residue information, motion vector information, and prediction mode information for each color component image.

The residue information included in the bitstream of a color image encoded according to an exemplary embodiment of the present invention may include encoded first residue block information of the first color component image and third residue block information of other color component images. In addition, the prediction mode information may include a predetermined syntax indicating whether the bitstream has been encoded according to an exemplary embodiment of the present invention, and predictor information used to generate a second residue block for the prediction of the second residue blocks of the remaining color component images. For example, the prediction mode information may include the constants of Equations (2) and (11) described above.

The prediction pixel block generating unit 840 generates a prediction pixel block of a pixel block having a predetermined size of each color component image using the prediction mode information included in the bitstream. In other words, the prediction pixel block generating unit 840 performs inter prediction or intra prediction according to a prediction mode of the current pixel block to generate a prediction pixel block of the current pixel block.

The residue generating unit 830 generates a second residue block of the remaining color component image by predicting a residue of the remaining color component image using the decoded first residue block of the first color component image output from the inverse quantization/inverse transformation unit 820. Here, the process of generating the second residue block of the remaining color component image is the same as the process of generating the second residue blocks in the second residue block generating portion 322 of FIG. 4, and thus a detailed description thereof will not be repeated here. Once the second residue block of the remaining color component image is generated, the residue generating unit 830 decodes a first residue block of the remaining color component image by adding the second residue block and the decoded third residue block of the remaining color component image. If a third residue block of a third color component image is predicted using the reconstructed first residue block of a second color component image, the residue generating unit 830 generates the second residue block of the third color component image by substituting the residue value of the reconstructed second residue block of the second color component into Equation (11) and decodes the first residue block of the third color component image by adding the generated second residue block and the decoded third residue block of the third color component image.

The reconstructing unit 850 reconstructs a pixel block of the remaining color component image by adding the generated first color component image of the remaining color component image and a prediction pixel block of the remaining color component image generated in the prediction pixel block generating unit 840. For the first color component image, a pixel block of the first color component image may be decoded without an additional second residue block prediction process by decoding the first residue block included in the bitstream, and adding the decoded first residue block and a prediction pixel block of the first color component image generated in the prediction pixel block generating unit 840.

Figure 9:
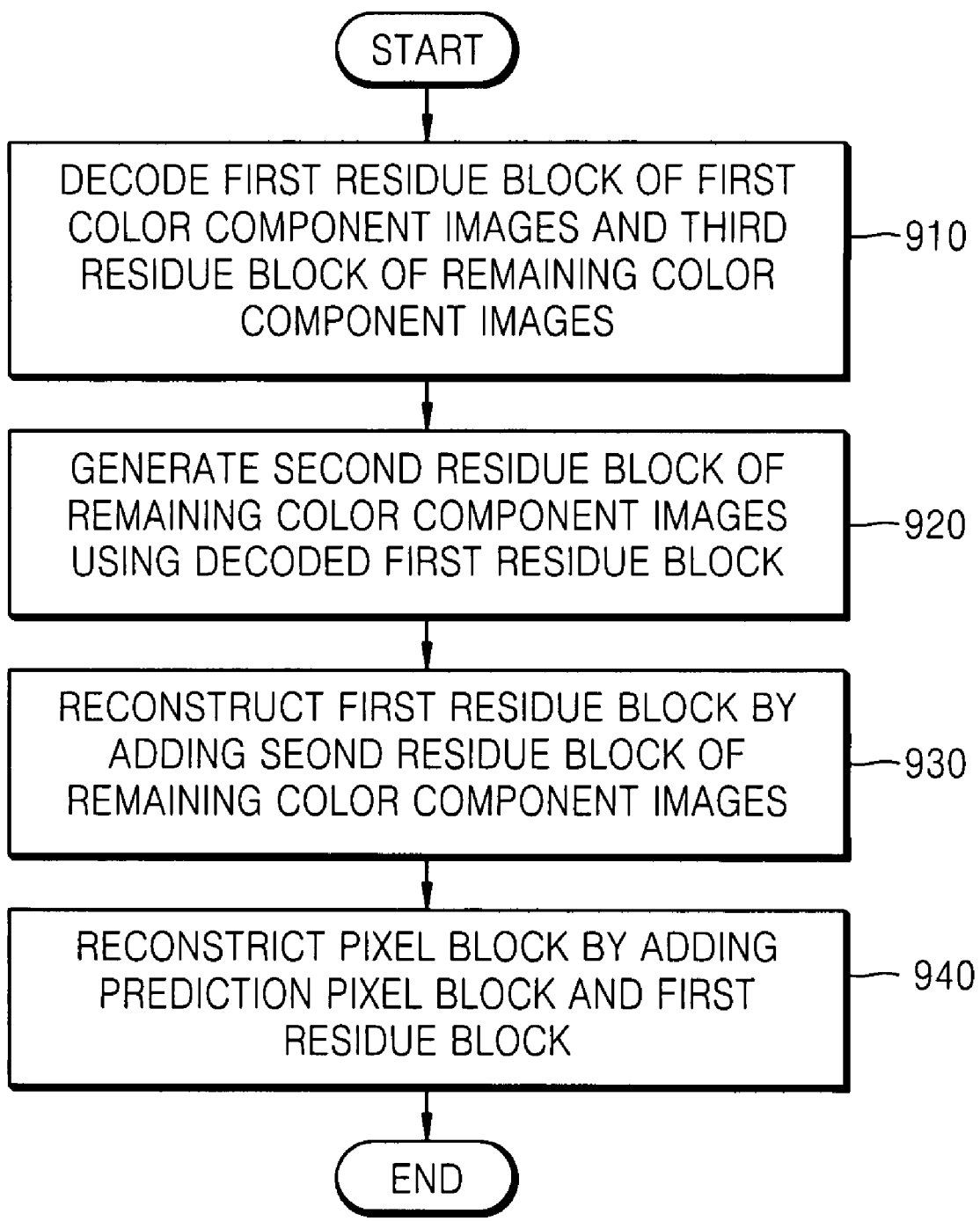
FIG. 9 is a flowchart illustrating an image decoding method according to another exemplary embodiment of the present invention.

FIG. 9 is a flowchart of an image decoding method according to an exemplary embodiment of the present invention.

Referring to FIG. 9, a first residue block of the first color component images and a third residue block of the remaining color component image, which is included in a bitstream, are decoded in operation 910.

In operation 920, a second residue block of the remaining color component image is generated using the decoded first residue block of the first color component image. As described above, the second residue block of the remaining color component image may be generated by substituting a residue value of the decoded first residue block of the first color component image into Equation (2).

In operation 930, a first residue block of the remaining color component image is reconstructed by adding the second residue block of the remaining color component image and a decoded third residue block of the remaining color component image.

In operation 940, a pixel block of each color component image is reconstructed by adding the prediction pixel block and the first residue of each color component image. The above-described processes are performed on each of pixel blocks constituting a frame to decode all the color component images.

The present invention can also be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

As described above, according to the exemplary embodiments of the present invention, predictive encoding is performed using correlation between a plurality of color component images constituting a single image, thereby improving encoding efficiency.

Moreover, according to the exemplary embodiments of the present invention, encoding is performed on an RGB input image in an RGB domain without transformation into a YUV domain, thereby preventing color distortion during transformation of the RGB image into another color format, and thus improving display quality.

While this invention has been particularly shown and described with reference to the exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the exemplary embodiments of the invention but by the appended claims, and all differences within the scope will be construed as being included in the present invention.

What is claimed is:

1. An image encoding method comprising:
generating a first residue block of each of a plurality of color component images of an input image, the first residue block corresponding to a difference between an input pixel block and a prediction pixel block of the each of the color component images;
encoding the first residue block of a first color component image among the color component images;
reconstructing the encoded first residue block of the first color component image;
generating a second residue block of each of at least one of remaining color component images which does not comprise the first color component image by predicting a residue of the each of the at least one of the remaining color component images using the reconstructed first residue block of the first color component image; and
generating a third residue block of the each of the at least one of the remaining color component images by calculating a difference between the first and second residue blocks of the each of the at least one of the remaining color component images.

2. The image encoding method of claim 1, wherein the color component images comprise a red (R) color component image, a green (G) color component image, and a blue (B) color component image.

3. The image encoding method of claim 1, wherein the generating a first residue block of each of a plurality of color component images of an input image comprises generating the prediction pixel block of the input pixel block of the each of the color component images by performing at least one of inter prediction and intra prediction on the each of the color component images in units of a block.

4. The image encoding method of claim 1, wherein the generating a second residue block of each of at least one of remaining color component images which does not comprise the first color component image is performed by calculating a prediction residue value $\overline{Y_{ij}}$ using the equation below:

$$\overline{Y_{ij}} = a \times X'_{ij} + b$$

where i×j, where i and j are integers, denotes a size of the reconstructed first residue block of the first color component image, $X'_{ij}$ denotes a residue value in an $i^{th}$ row and a $j^{th}$ column of the reconstructed first residue block of the first color component image, $\overline{Y_{ij}}$ denotes a prediction residue value, which corresponds to $X'_{ij}$, of the second residue block of the each of the at least one of the remaining color component images, a denotes a predetermined weight, and b denotes a predetermined offset value.

5. The image encoding method of claim 4, wherein a and b are determined based on a linear regression model using a reconstructed neighbor residue block of the first color component image and a reconstructed neighbor residue block of the each of the at least one of the remaining color component images.

6. The image encoding method of claim 4, wherein a is 1, and b is an average of differences between residue values of a reconstructed neighbor residue block of the each of the at least one of the remaining color component images and residue values of a reconstructed neighbor residue block of the first color component image.

7. The image encoding method of claim 1, wherein the generating a second residue block of each of at least one of remaining color component images which does not comprise the first color component image comprises: generating the second residue block of a second color component image, among the remaining color component images, using the reconstructed first residue block of the first color component image; and
generating the second residue block of a third color component image, among the remaining color component images, using a first residue block of the second color component image which is reconstructed from an encoded first residue block of the second color component image.

8. An image encoding apparatus comprising:
a processor;
a prediction pixel block generating unit, executed on the processor, which generates a prediction pixel block of an input pixel block of each of a plurality of color component images constituting an input image;
a residue generating unit which generates:
a first residue block of each of the color component images that corresponds to a difference between the input pixel block and the prediction pixel block of the each of the color component images;
a second residue block of each of at least one of remaining color component images which does not comprise a first color component image among the color component images by predicting a residue of the each of the at least one of the remaining color component images using a reconstructed first residue block of the first color component image; and
a third residue block of the each of the at least one of the remaining color component images, that corresponds to a difference between the first and second residue blocks of the each of the at least one of the remaining color component images; and
an encoding unit which encodes the generated residue blocks.

9. The image encoding apparatus of claim 8, wherein the color component images comprise a red (R) color component image, a green (G) color component image, and a blue (B) color component image.

10. The image encoding apparatus of claim 8, wherein the prediction pixel block generating unit generates the prediction pixel block of the input pixel block of the each of the color component images by performing at least one of inter prediction and intra prediction on the each of the color component images in units of a block.

11. The image encoding apparatus of claim 8, wherein the residue generating unit generates the second residue block of the each of the at least one of the remaining color component images by calculating a prediction residue value $\overline{Y_{ij}}$ using the equation below:

$$\overline{Y_{ij}} = a \times X'_{ij} + b$$

where i×j, where i and j are integers, denotes a size of the reconstructed first residue block of the first color component image, $X1_{ij}$ denotes a residue value in an $i^{th}$ row and a $j^{th}$ column of the reconstructed first residue block of the first color component image, $\overline{Y_{ij}}$ denotes a prediction residue value, which corresponds to $X1_{ij}$, of the second residue block of the each of the at least one of the remaining color component images, a denotes a predetermined weight, and b denotes a predetermined offset value.

12. The image encoding apparatus of claim 11, wherein a and b are determined based on a linear regression model using a reconstructed neighbor residue block of the first color component image and a reconstructed neighbor residue block of the each of the at least one of the remaining color component images.

13. The image encoding apparatus of claim 11, wherein a is 1, and b is an average of differences between residue values of a reconstructed neighbor residue block of the each of the at least one of the remaining color component images and residue values of a reconstructed neighbor residue block of the first color component image.

14. The image encoding apparatus of claim 8, wherein the residue generating unit generates:
the second residue block of a second color component image, among the remaining color component images, using the reconstructed first residue block of the first color component image; and
the second residue block of a third color component image, among the remaining color component images, using a first residue block of the second color component image which is reconstructed from an encoded first residue block of the second color component image.

15. An image decoding method comprising operations of:
receiving a bitstream comprising:
a first residue block of each of a plurality of color component images of an input image, the first residue block corresponding to a difference between an input pixel block and a prediction pixel block of the each of the color component images; and
a third residue block of each of at least one of remaining color component images which does not comprise a first color component image among the color component images, the third residue block corresponding to a difference between a second residue block of the each of the at least one of the remaining color component images predicted using the first residue block of the first color component image, and the first residue block of the each of the at least one of the remaining color component images;
decoding the first residue block of the first color component image and the third residue block of the each of the at least one of the remaining color component images;
generating the second residue block of the each of the at least one of the remaining color component images by predicting a residue of the each of the at least one of the remaining color component images using the decoded first residue block of the first color component image;
reconstructing a first residue block of the each of the at least one of the remaining color component images by adding the generated second residue block and the decoded third residue block; and
reconstructing pixel blocks of the color component images by adding the prediction pixel block and the first residue block of the each of the color component images.

16. The image decoding method of claim 15, wherein the color component images comprise a red (R) color component image, a green (G) color component image, and a blue (B) color component image.

17. The image decoding method of claim 15, wherein the generating the second residue block of the each of the at least one of the remaining color component images is performed by calculating a prediction residue value $\overline{Y_{ij}}$ using the equation below:

$$\overline{Y_{ij}} = a \times X'_{ij} + b$$

where i×j, where i and j are integers, denotes a size of the decoded first residue block of the first color component image, $X1_{ij}$ denotes a residue value in an $i^{th}$ row and a $j^{th}$ column of the decoded residue block of the first color component image, $\overline{Y_{ij}}$ denotes a prediction residue value, which corresponds to $X1_{ij}$, of the second residue block of the each of the at least one of the remaining color component images, a denotes a predetermined weight, and b denotes a predetermined offset value.

18. The image decoding method of claim 17, wherein a and b are determined based on a linear regression model using a decoded neighbor residue block of the first color component image and a decoded neighbor residue block of the each of the at least one of the remaining color component images.

19. The image decoding method of claim 17, wherein a is 1, and b is an average of differences between residue values of a decoded neighbor residue block of the each of the at least one of the remaining color component images and residue values of a decoded neighbor residue block of the first color component image.

20. The image decoding method of claim 15, wherein the generating the second residue block of the each of the at least one of the remaining color component images comprises:
generating the second residue block of a second color component image, among the color component images, using the decoded first residue block of the first color component image; and
generating the second residue block of a third color component image, among the color component images, using a decoded first residue block of the second color component image.

21. An image decoding apparatus comprising:
a processor;
a decoding unit, executed on the processor, which:
receives a bitstream comprising:
a first residue block of each of a plurality of color component images of an input image, the first residue block corresponding to a difference between an input pixel block and a prediction pixel block of the each of the color component images; and
a third residue block of each of at least one of remaining color component images which does not comprise a first color component image among the color component images, the third residue block corresponding to a difference between a second residue block of the each of the at least one of the remaining color component images predicted using the first residue block of the first color component image, and the first residue block of the each of the at least one of the remaining color component images, and
decodes the first residue block of the first color component image and the third residue block of the each of the at least one of the remaining color component images;
a residue generating unit which:
generates the second residue block of the each of the at least one of the remaining color component images by predicting a residue of the each of the at least one of the remaining color component images using the decoded first residue block of the first color component image; and reconstructs a first residue block of the each of the at least one of the remaining color component images by adding the generated second residue block and the decoded third residue block of the each of the at least one of the remaining color component images; and a reconstructing unit which reconstructs pixel blocks of the color component images by adding the prediction pixel block and the first residue block of the each of the color component images.

22. The image decoding apparatus of claim 21, wherein the color component images comprise a red (R) color component image, a green (G) color component image, and a blue (B) color component image.

23. The image decoding apparatus of claim 21, wherein the residue generating unit generates the second residue block of the remaining color component images by calculating a prediction residue value $\overline{Y_{ij}}$ using the equation below:

$$\overline{Y_{ij}} = a \times X'_{ij} + b$$

where i×j, where i and j are integers, denotes a size of the decoded first residue block of the first color component image, $X'_{ij}$ denotes a residue value in an $i^{th}$ row and a $j^{th}$ column of the decoded residue block of the first color component image, $\overline{Y_{ij}}$ denotes a prediction residue value, which corresponds to $X'_{ij}$, of the second residue block of the each of the at least one of the remaining color component images, a denotes a predetermined weight, and b denotes a predetermined offset value.

24. The image decoding apparatus of claim 23, wherein a and b are determined based on a linear regression model using a decoded neighbor residue block of the first color component image and a decoded neighbor residue block of the each of the at least one of the remaining color component images.

25. The image decoding apparatus of claim 23, wherein a is 1, and b is an average of differences between residue values of a decoded neighbor residue block of the at least one of the remaining color component images and residue values of a decoded neighbor residue block of the first color component image.

26. The image decoding apparatus of claim 21, wherein the residue generating unit generates:

the second residue block of a second color component image, among the color component images, using the decoded first residue block of the first color component image; and the second residue block of a third color component image, among the color component images, using a decoded first residue block of the second color component image.

\* \* \* \* \*